United States Patent
Sezer et al.

(10) Patent No.: US 8,032,543 B2
(45) Date of Patent: Oct. 4, 2011

(54) SORTING APPARATUS AND METHOD

(75) Inventors: Sakir Sezer, Belfast (GB); Kieran McLaughlin, Maghera (GB)

(73) Assignee: The Queen's University of Belfast, Belfast (GB)

( * ) Notice: Subject to any disclaimer, the term of this patent is extended or adjusted under 35 U.S.C. 154(b) by 157 days.

(21) Appl. No.: 12/095,993

(22) PCT Filed: Dec. 5, 2006

(86) PCT No.: PCT/GB2006/004526
§ 371 (c)(1),
(2), (4) Date: Nov. 18, 2008

(87) PCT Pub. No.: WO2007/066085
PCT Pub. Date: Jun. 14, 2007

(65) Prior Publication Data
US 2009/0182714 A1   Jul. 16, 2009

(30) Foreign Application Priority Data
Dec. 6, 2005   (GB) .................................. 0524845.5

(51) Int. Cl.
G06F 7/00 (2006.01)
G06F 17/30 (2006.01)

(52) U.S. Cl. ...................................... 707/758; 707/770

(58) Field of Classification Search .................. None
See application file for complete search history.

(56) References Cited

U.S. PATENT DOCUMENTS

| | | | |
|---|---|---|---|
| 4,630,234 A | 12/1986 | Holly | |
| 5,878,410 A * | 3/1999 | Zbikowski et al. | 1/1 |
| 6,032,207 A | 2/2000 | Wilson | |
| 6,711,153 B1 * | 3/2004 | Hebb et al. | 370/351 |
| 6,938,097 B1 * | 8/2005 | Vincent et al. | 709/240 |
| 2003/0126116 A1 | 7/2003 | Chen et al. | |
| 2005/0108230 A1 | 5/2005 | Carroll | |

OTHER PUBLICATIONS

Stephens et al., Implementing Scheduling Algorithms in High-Speed Networks, IEEE Journal on Selected Areas in Communications, vol. 17 Issue: 6, pp. 1145-1158, Jun. 1999.*

Hui Zhang, "Service Disciplines for Guaranteed Performance Service in Packet-Switching Networks", Proceedings of the IEEE, IEEE. New York, US, vol. 83, No. 10, Oct. 10, 1995, ISSN: 0018-9219, 26 pages.

International Search Report for PCT/GB2006/004526, mailed on Apr. 2, 2007, 3 pages.

(Continued)

*Primary Examiner* — Jay Morrison
(74) *Attorney, Agent, or Firm* — Foley & Lardner LLP; John D. Lanza

(57) ABSTRACT

A sorting apparatus and method for sorting units into a unit storage structure in accordance with a pre-determined order, the sorting apparatus comprising a unit search structure containing a record of units in the unit storage structure, and a unit location pointer structure containing location pointers for units in the unit storage structure, wherein the sorting apparatus receives a unit being sorted, the unit search structure reads the unit being sorted, uses its record of units in the unit storage structure to search for a closest matching unit to the unit being sorted, accesses the unit location pointer structure and retrieves a location pointer for the closest matching unit, and the sorting apparatus uses the location pointer of the closest matching unit to access the unit storage structure and to place the unit being sorted into the unit storage structure in an appropriate position in accordance with the pre-determined order.

24 Claims, 1 Drawing Sheet

OTHER PUBLICATIONS

Figure 1:
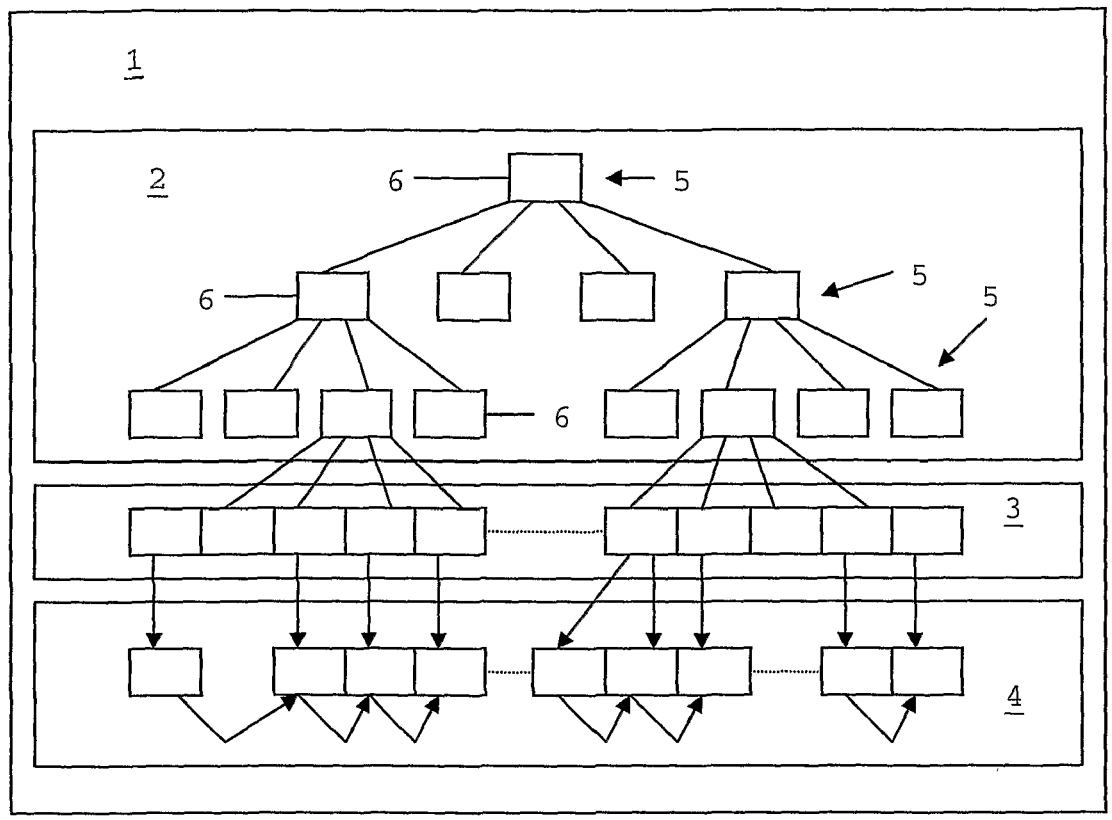

Written Opinion for PCT/GB2006/004526, mailed on Apr. 2, 2007, 6 pages.

International Preliminary Report on Patentability for PCT/GB2006/004526, mailed on Jun. 11, 2008, 7 pages.

* cited by examiner

SORTING APPARATUS AND METHOD

The invention relates to a sorting apparatus and method, and particularly, but not exclusively, to a sorting apparatus and method for sorting tags of packets in telecommunications networks.

There are many applications where it is desirable to sort individual units into an order, for example an ascending order or a descending order. Such an application is packet-switched telecommunications networks. Packet switched telecommunications networks operate by splitting data to be propagated through a network into packets. The packets are propagated through the network separately. It is a common occurrence at network nodes, such as routers, for packets from many different inputs of a node to be required to be propagated to a single output of the node. This results in packet queuing and packet propagation contention, which requires the scheduling of the servicing of the packets, e.g. deciding the order in which the packets are to be serviced. Conventionally, this is achieved by assigning a tag to each packet, and determining an order in which the tags, and therefore the packets, should be scheduled for servicing. For example, it is often determined to service the tags in an ascending order. The values of the tags are then calculated, using a scheduling policy, such that lower tag values are assigned to packets having higher scheduling priorities and higher tag values are assigned to packets having lower scheduling priorities.

To service the tags in ascending order requires either repeated searching for the tag having the lowest value, or sorting the tags into ascending order and repeated reading of the tag at the beginning of the order. Various methods of each technique have been used. However, improvement of the sorting techniques is desirable, particularly as the use and desired speed of telecommunications networks continues to increase and packet scheduling becomes ever more important.

According to a first aspect of the invention there is provided a sorting apparatus for sorting units into a unit storage structure in accordance with a pre-determined order, the sorting apparatus comprising a unit search structure containing a record of units in the unit storage structure, and a unit location pointer structure containing location pointers for units in the unit storage structure, wherein the sorting apparatus receives a unit being sorted, the unit search structure reads the unit being sorted, uses its record of units in the unit storage structure to search for a closest matching unit to the unit being sorted, accesses the unit location pointer structure and retrieves a location pointer for the closest matching unit, and the sorting apparatus uses the location pointer of the closest matching unit to access the unit storage structure and to place the unit being sorted into the unit storage structure in an appropriate position in accordance with the pre-determined order.

Use of the unit location pointer structure means that the unit search structure does not have to directly access the unit storage structure. The search structure and the storage structure are isolated from each other. This allows a more flexible design to be adopted for the sorting apparatus. In addition, using this arrangement for the sorting apparatus allows the sorting function of the apparatus to be carried out separately from retrieval of the units from the unit storage structure. This allows the storage structure's capacity to remain flexible, whilst still enabling retrieval of the units.

The unit search structure may comprise a tree search structure. The tree search structure may comprise a multi-bit tree search structure. Using a multi-bit tree search structure allows compression of the tree structure, and increases the speed of the search structure. The tree search structure may comprise a plurality of search levels. The tree search structure may comprise a first search level comprising at least one node. The tree search structure may comprise one or more further search levels, each comprising one or more nodes linked to a node of the preceding search level. At least some of the nodes may contain the record of units in the unit storage structure. Each of the nodes may comprise one or more bits. At least some of the bits of the nodes may contain the record of units in the unit storage structure.

The tree search structure may search for the closest matching unit by comparing at least one segment of the unit being sorted with at least one node of one or more search levels to find the closest match to the or each segment, and hence to find the closest matching unit to the unit being sorted. For example, the tree search structure may search for the closest matching unit by comparing a first segment of the unit being sorted with a node of a first search level of the tree search structure to find the closest match to the first segment and a node in a second search level of the tree search structure to which the node in the first search level is linked, comparing a second segment of the unit being sorted with the node of the second search level to find the closest match to the second segment and a node in a third search level of the tree search structure to which the node in the second search level is linked, and comparing a third segment of the unit being sorted with the node of the third search level to find the closest match to the third segment, and hence the closest matching unit to the unit being sorted.

The tree search structure may update its record of the units in the unit storage structure. This may be carried out after a unit has been sorted. This may be carried out whilst a unit is being sorted.

The unit location pointer structure may comprise a location for a location pointer for each unit which may be sorted by the sorting apparatus into the unit storage structure. A location may contain a location pointer for a unit if that unit has been sorted by the sorting apparatus into the unit storage structure. The sorting apparatus may place a location pointer for a unit into the unit location pointer structure after the unit has been sorted. The unit location pointer structure may comprise a look-up table. The unit location pointer structure may be linked to the unit search structure. The unit location pointer structure may be linked to the unit search structure so that it effectively comprises a lowest level of the tree search structure of the unit search structure.

The sorting apparatus may operate a unit sorting policy to sort the units into the pre-determined order. The order may be ascending unit value order. The order may be descending unit value order.

The sorting apparatus may comprise a distributed memory architecture for the unit search structure and the unit location pointer structure. In particular, each search level of the tree search structure of the unit search structure and the unit location pointer structure may comprise independently accessible memory architectures. The memory architectures may be written to or read from independently of each other. This provides a parallel pipelined structure for the sorting apparatus. This increases the speed of searching of the unit search structure, and of sorting of the sorting apparatus. The sorting apparatus may operate according to cycles of a clock. A memory architecture may be accessible only once in each clock cycle. Using independently accessible memory architectures for the search levels of the tree search structure of the unit search structure and the unit location pointer structure allows the sorting apparatus to retrieve a location pointer of a closest matching unit, in each clock cycle. Using independently accessible memory architectures for the search levels of the tree search structure of the unit search structure and the unit location pointer structure may allow the sorting apparatus to sort a unit in each clock cycle. This will be the case if placing a unit in the unit storage structure can be carried out in one clock cycle.

Using a distributed memory architecture for the unit search structure and the unit location pointer structure, with particularly, four independently accessible memory architectures for each search level of the tree search structure of the unit search structure and the unit location pointer structure, increases the throughput speed of the sorting apparatus, but also increases the complexity and the cost of the apparatus. It will be appreciated that other numbers of memory architectures could be used for the unit search structure and the unit location pointer structure. For example, only one memory architecture could be used for the unit search structure and the unit location pointer structure, or two, or three memory architectures could be used for the unit search structure and the unit location pointer structure. In choosing the number of memory architectures to use, a trade-off must be made between the speed of the sorting apparatus and the cost of the sorting apparatus.

The sorting apparatus may be hardware based. The sorting apparatus may be hardware based by implementation using system on chip (SoC) technology. The sorting apparatus may comprise a SoC memory architecture for the unit search structure and the unit location pointer structure. The SoC memory architecture of the unit search structure may comprise a block of RAM memory. When the unit search structure comprises a tree search structure, a first search level and a second search level of the tree search structure may comprise a plurality of registers, and further search levels of the tree search structure may each comprise a block of RAM memory.

The unit storage structure may be provided separately from the sorting apparatus. Alternatively, the sorting apparatus may comprise the unit storage structure. The unit storage structure may comprise a linked list. The units stored in the linked list may be linked together such that they are in the pre-determined order. For each unit, the unit storage structure may additionally store one or more elements associated with the unit. Using a linked list for the unit storage structure allows use of memory as it is required for units as they are sorted, rather than setting aside memory for all possible units which may be sorted. This is particularly important as it greatly simplifies memory management and control over memory allocation and may also be beneficial if the unit storage structure is implemented in memory which is being shared by other devices.

A single sorting apparatus may be used to sort units. Alternatively, a plurality of sorting apparatus may be used in conjunction to sorts units. Each sorting apparatus may operate according to cycles of a clock. Using a plurality of sorting apparatus in conjunction may allow a unit to be sorted in each clock cycle. For example, four sorting apparatus may be used in conjunction to sorts units. The units may be sorted into four separate unit storage structures, one unit storage structure for each sorting apparatus. When placing a unit in the unit storage structure is carried out in four clock cycles, using four sorting apparatus in conjunction will allow a unit to be sorted in each clock cycle.

The sorting apparatus may sort tags of packets of a telecommunications network. The sorting apparatus may operate a tag sorting policy to sort the tags of the packets. The tags may be calculated by a tag computation circuit. The tag computation circuit may operate a packet scheduling policy to calculate the tags. The packet scheduling policy may comprise, for example, any of the family of fair queuing policies, e.g. a weighted fair queuing policy.

The sorting apparatus may comprise part of a packet scheduler. The sorting apparatus or the scheduler may comprise part of a router of a telecommunications network.

According to a second aspect of the invention there is provided a method of sorting units into a unit storage structure in accordance with a pre-determined order, using a sorting apparatus comprising a unit search structure containing a record of units in the unit storage structure, and a unit location pointer structure containing location pointers for units in the unit storage structure, the method comprising the sorting apparatus receiving a unit being sorted, the unit search structure reading the unit being sorted, using its record of units in the unit storage structure to search for a closest matching unit to the unit being sorted, accessing the unit location pointer structure and retrieving a location pointer for the closest matching unit, and the sorting apparatus using the location pointer of the closest matching unit to access the unit storage structure and to place the unit being sorted into the unit storage structure in an appropriate position in accordance with the pre-determined order.

According to a third aspect of the invention there is provided a scheduler for a telecommunications network, the scheduler comprising a sorting apparatus according to the first aspect of the invention.

Figure 2:
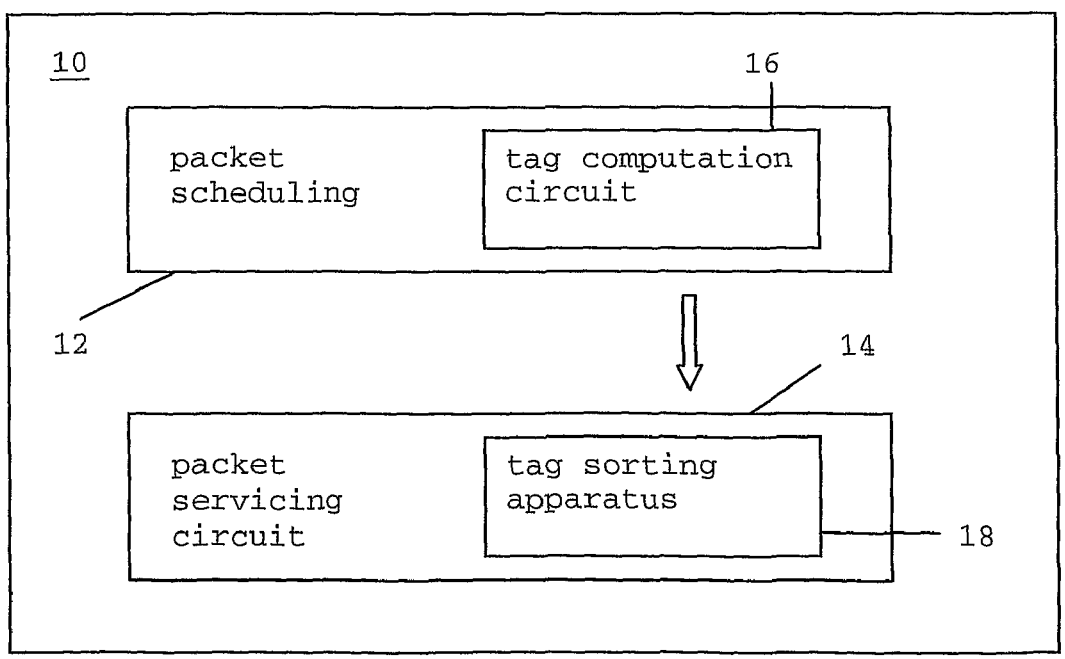

An embodiment of the invention will now be described, by way of example only, with reference to the accompanying drawings, in which:

FIG. 1 is a schematic representation of a sorting apparatus according to the first aspect of the invention, and FIG. 2 is a schematic representation of a scheduler according to a second aspect of the invention, incorporating the sorting apparatus of FIG. 1.

The sorting apparatus 1 shown in FIG. 1 comprises a unit search structure 2, a unit location pointer structure 3 and also a unit storage structure 4. It will be appreciated, however, that the unit storage structure could be provided external to the sorting apparatus.

The unit search structure comprises a multi-bit tree search structure, which comprises three search levels 5, as shown, each level comprising one or more nodes 6. It will be appreciated that the tree search structure could comprise more or less search levels, and more or less nodes in each level. This tree search structure sorts units which have a length of six bits, using unit segments having lengths of two bits. It will again be appreciated that the invention is not limited to this tree search structure, but encompasses tree search structures for sorting units of different lengths. Each node 6 in the three search levels 5 of the tree search structure 2 comprises four bits, one bit for each unit segment option 00, 01, 10 or 11. The bits of the nodes of the levels are used to contain a record of units which have been sorted by the apparatus into the unit storage structure. A bit contains a 0 if a unit segment corresponding to the unit segment option of the bit has not been previously sorted by the apparatus. A bit contains a 1 if a unit segment corresponding to the unit segment option of the bit has been previously sorted by the apparatus. Bits of a node containing a 1 in the first and second search levels will be linked to a node, a child node, in the level below it in the tree search structure.

The tree search structure is implemented in memory. The first two search levels of the structure consist of registers, whilst the third search level consists of a block of RAM. The first two search levels may be implemented using registers, as the amount of memory needed for these search levels is relatively small and can be realised using registers.

The unit location pointer structure 3 comprises a look-up table. A location is provided in the table for each unit which may be sorted by the sorting apparatus into the unit storage structure. A location of the unit location pointer structure will contain a location pointer for a unit if that unit has been sorted by the sorting apparatus into the unit storage structure. For each unit, the location pointer indicates the position of the unit in the unit storage structure. The unit location pointer structure is implemented in memory, and comprises a block of RAM. The unit search structure and the unit location pointer structure are linked, such that the unit location pointer structure effectively forms a fourth search level of the tree search structure of the unit search structure.

The unit storage structure 4 comprises a linked list. The linked list is implemented in memory. The units in the linked list may be randomly distributed throughout the memory. The units stored in the linked list are linked together such that they are in the pre-determined order. Each entry of the linked list contains a unit and a location pointer to the subsequent unit in the list. In this embodiment of the sorting apparatus, the linked list is included on chip with the unit search structure 2 and the unit location pointer structure 3. However, the linked list may be implemented off chip on, for example, external dual port RAM.

The sorting apparatus operates as follows. A unit sorting policy is chosen, which determines the pre-determined order in which the units are sorted into the unit storage structure. In this embodiment the pre-determined order is ascending order of the units. It will be appreciated, however, that other orders for the units could be chosen, e.g. descending order.

Units to be sorted are received by the sorting apparatus 1, and are read by the unit search structure 2. For each unit which is read by the unit search structure, a decoding procedure is carried out at each of the three search levels 5 of the tree search structure, based on the unit's value. This procedure searches for the closest matching unit of the units in the unit storage structure, using the record of these units contained in the unit search structure. For example, to find the closest matching unit for a unit having a value of 110110, a unit segment comprising the first two bits, 11, is compared to the node in the first search level of the tree search structure. The fourth bit in this node is associated with the unit segment option 11. If a 1 is present in the fourth bit, this indicates that a unit beginning with 11 has already been sorted by the apparatus, and that the fourth bit of the node is linked to a node in the search level below it, i.e. the second search level, of the tree search structure. A unit segment comprising the next two bits, 01, of the unit is then compared with the node in the second search level. If the second bit of this node contains a 1 this indicates that a unit starting with 1101 has previously been sorted by the apparatus, and that the second bit of this node is linked to a node in the search level below it, i.e. the third search level, of the tree search structure. (If the second bit contains a 0, then the four bits in the node in the second search level are scanned to find the closest possible match to the unit segment 01, and the corresponding node in the third search level.) A unit segment comprising the last two bits, 10, of the unit is then compared with the node in the third search level. The third bit of this node will usually contain a zero, as it is unlikely that the apparatus has already sorted a unit which is exactly the same as the unit currently being sorted. The four bits in the node in the third search level are scanned to find the closest possible match to the unit segment 10. This may be, for example, 01. The closest matching unit to the unit being sorted is then 110101.

Each node of the third search level of the tree search structure is linked to four entries in the unit location pointer structure, an entry for each of the unit segment options, 00, 01, 10, and 11. The unit location pointer structure contains pointers to the location of units in the unit storage structure. In this example, unit 110110 has not been sorted previously, and the site for this unit in the unit location pointer structure will be empty. The closest matching unit has been determined to be 110101. The sorting apparatus accesses the location in the unit location pointer structure for this unit, and reads the location of this unit in the unit storage structure.

At this point the unit being sorted can easily be inserted into the linked list unit storage structure in the correct position according to the pre-determined order, i.e. in this example ascending order. The sorting apparatus requests a storage location in the linked list for the unit being sorted, and stores the unit in this location. The sorting apparatus uses the location pointer of the closest matching unit, 110101, to access the location of this unit in the linked list, and reads the location pointer for the subsequent unit in the linked list from this location. The sorting apparatus changes the location pointer in the location of the unit 110101 to point to the location in the linked list of the unit being sorted. The sorting apparatus also inserts the location pointer of the subsequent unit in the linked list, which it has read from the closest matching unit location, into the location of the linked list for the unit being sorted. Thus the unit being sorted is placed in the linked list unit storage structure in a position according to ascending order of the units.

The record of the units in the unit storage structure contained in the unit search structure is updated. This can be done after a unit has been sorted or as the closest matching unit to the unit is being searched for. For each segment of the unit, a 1 is placed in the appropriate bit of the appropriate node in the first, second and third search levels of the tree search structure. For the example given above, a 1 is placed the fourth bit in the node of the first search level, a 1 is placed in the second bit of the node accessed in the second search level, and a 1 is placed in the third bit of the node accessed in the third search level. For each unit which has been sorted, the sorting apparatus also places a location pointer to the location in the unit storage structure of the unit, in the unit location pointer structure.

The multi-bit tree search structure of the unit search structure and the unit location pointer structure are implemented using a distributed memory architecture. The three search levels of the tree search structure and the unit location pointer structure are held in independently accessible memory architectures. The levels of the tree search structure and the unit location pointer structure can be written to or read from independently of each other. This provides a parallel pipelined structure of the sorting apparatus, improving the speed of operation of the apparatus.

The above description applies to the second and subsequent units sorted by the sorting apparatus. When a unit to be sorted is the first unit sorted by the apparatus, a different, first unit sort procedure must be used. When the first unit to be sorted is received by the sorting apparatus, and the unit search structure is accessed, the bits of the node of the first search level of the tree search structure will each contain a zero. This triggers the sorting apparatus to apply the first unit sort procedure. The first unit has a location in the linked list unit storage structure assigned to it. Then the unit search structure reads a first segment of the first unit, writes a 1 in the appropriate bit of the node of the first search level of the tree search structure, and moves to the node in the second search level linked to the bit in the node of the first search level. The unit search structure then reads the next segment of the first unit, writes a 1 in the appropriate bit of the node of the second search level, and moves to the node in the third search level linked to the bit in the node of the second search level. The unit search structure then reads the last segment of the first unit, writes a 1 in the appropriate bit of the node of the third search level, moves to the location in the unit location pointer structure assigned to the first unit, and writes the unit storage structure location assigned to the first node into the location in the unit location pointer structure. The sorting apparatus then uses the location pointer of the first unit to place the first unit into its pre-assigned location in the unit storage structure.

The sorting apparatus may operate according to cycles of a clock, for example if the sorting apparatus comprises part of a telecommunications network. When this is the case, it is usual that any particular memory may be accessed only once per clock cycle. The three search levels of the tree search structure and the unit location pointer structure are held in independently accessible memory locations, and therefore all three search levels and the pointer location structure could be accessed in the same clock cycle. Therefore after the first three clock cycles, the sorting apparatus can retrieve a location pointer of a closest matching unit for a unit being sorted, in each clock cycle. The sorting apparatus could therefore sort a unit in each clock cycle, if it were to take only one clock cycle to place a unit in the unit storage structure. However, the memory which comprises the linked list unit storage structure must be accessed four times to place a unit in the linked list. Therefore it will take four clock cycles to place a unit in the linked list. A unit is therefore input into the sorting apparatus every four clock cycles, otherwise a queue of units, for which closest matching unit location pointers have been retrieved, and which are to be placed in the linked list would occur. Therefore, the sorting apparatus only sorts a unit every four clock cycles. Each of the three search levels and the location pointer structure will only be accessed every four clock cycles. The 'redundant' clock cycles in between can be used to update the bits of the tree search structure and the location pointers in the location pointer structure, as more than one of the search levels and the location pointer structure can be accessed in the same clock cycle due to their independently accessible memory locations.

The architecture of the sorting apparatus has been implemented in VHDL and synthesised for a Xilinx Virtex FPGA using Synplicity and Xilinx Foundation tools. At a clock speed of 84 MHz, with 4 clock cycles per sort operation, this implementation can support an average unit size of 250 B at 40 Gbps. Using SoC technologies for the implementation of this circuit, can allow speeds exceeding 100 Gbps to be achieved.

A single sorting apparatus may be used to sort units. Alternatively, a plurality of sorting apparatus may be used in conjunction to sorts units. For example, four sorting apparatus may be used in conjunction to sorts units. The units are sorted into four separate unit storage structures, one unit storage structure for each sorting apparatus. (In this case, when retrieval of a unit is required, the first unit of each storage structure is read, and the unit having the lowest value is retrieved). Each sorting apparatus may operate according to cycles of a clock. As above when the unit storage structures are linked lists, it will take four clock cycles to place a unit in a storage structure. Each sorting apparatus can therefore only sort a unit every four clock cycles. Using four sorting apparatus in conjunction will allow a unit to be sorted in each clock cycle.

FIG. 2 shows a schematic representation of a scheduler for a packet based telecommunications network. The scheduler comprises part of a router of the telecommunications network. The router acts to route packets of data being propagated through the network. The router receives the packets through several inputs of the router, a number of which packets will be required to be propagated to an output of the router. This necessitates scheduling of the propagation of the packets.

Such scheduling is carried out by the scheduler. The scheduling process is composed of two phases, packet scheduling policy functions and packet servicing functions. The scheduler 10 comprises a packet scheduling policy circuit 12, which is responsible for the packet scheduling policy functions, and a packet servicing circuit 14, which is responsible for the packet servicing functions.

The packet scheduling policy circuit 12 operates a packet scheduling policy, which is used to determine the scheduling, particularly the order, of the propagation of the packets through the scheduler. The scheduling policy circuit calculates a tag for each packet in accordance with the scheduling policy, and the value of the tag is used to determine the scheduling of the packets relative to one another. It is usually determined to schedule the tags for servicing in an ascending order. The values of the tags are then calculated, using the scheduling policy, such that lower tag values are assigned to packets having higher scheduling priorities and higher tag values are assigned to packets having lower scheduling priorities.

The packet scheduling policy circuit comprises a tag computation circuit 16, which is used to calculate the tags. Once calculated, the tags are passed to the packet servicing circuit 14.

The tags received by the packet servicing circuit 14 are essentially in a random order. This is because, whilst the packets in a single traffic flow in the network will receive tags increasingly higher than those previously assigned to that flow, packets from separate traffic flows will not receive tags in ascending order, but according to the properties of the flows and the scheduling policy operated by the tag computation circuit. The scheduler receives packets from a number of flows, and therefore the calculated tag values will not have a specific order. If the tags are stored in the order in which they are received from the tag computation circuit, i.e. a random order, this has implications for the subsequent retrieval of tags for servicing of their associated packets. As usually, the tags are to be retrieved in ascending order, starting with the lowest tag first, to facilitate this, the tags are sorted into ascending order as soon as they arrive at the packet servicing circuit, so that they are stored in order.

The packet servicing circuit 14 comprises a tag sorting apparatus 18. The tag sorting apparatus has the same structure as the unit sorting apparatus of FIG. 1 described above. The tag sorting apparatus 18 comprises a tag search structure, a tag location pointer structure and a tag storage structure. As previously described, when a tag to be sorted is received by the tag search structure, a closest matching value search is carried out. This returns a location pointer from the tag location pointer structure to the tag in the tag storage structure which is the closest match to the tag being sorted. The tag being sorted is then inserted in the correct position in the tag storage structure according to ascending order of the tags. The tag sorting apparatus therefore provides a solution to the problem of sorting the tags into ascending order. As the search levels of the tag tree search structure and the tag location pointer structure are implemented independently of each other, this provides a high speed tag sorting method, and a scheduler capable of scheduling packets in multi gigabit line speed networks.

As the sorting of the arriving tags is taking place, the scheduler is also retrieving sorted tags, and forwarding the packets associated with them to the output of the scheduler, for onward propagation out of the router into the network. The sorted tags are retrieved in ascending order, starting with the lowest tag first. This is a simple process of repeatedly reading the tag in the first entry of the linked list tag storage structure, as the tags have been sorted into ascending order in the linked list storage structure. Each entry of the tag storage structure contains the tag, and also a location pointer which gives the location of where the packet associated with the tag has been stored, allowing the packet to be retrieved for onward propagation out of the scheduler and router.

What is claimed is:

1. A sorting apparatus for sorting tags of packets of a telecommunication network into a tag storage structure in accordance with a pre-determined order, the sorting apparatus comprising:
 a tag search structure containing a record of tags in the tag storage structure; and
 a tag location pointer structure containing location pointers for tags in the tag storage structure, wherein:
  the sorting apparatus is adapted to receive a tag being sorted;
  the tag search structure is adapted to:
   read the tag being sorted;
   search for a closest matching tag to the tag being sorted using its record of the tag in the tag storage structure;
   access the tag location pointer structure; and
   retrieve a location pointer for the closest matching tag; and
  the sorting apparatus is further adapted to use the location pointer of the closest matching tag to access a linked list in the tag storage structure and to place the tag being sorted into the tag storage structure in an appropriate position in accordance with the predetermined order, wherein:
  the system comprises a distributed memory for the tag search structure and the tag location pointer, the distributed memory having a plurality of independently accessible memory locations forming a parallel pipeline structure for the sorting apparatus.

2. The sorting apparatus according to claim 1, in which the tag search structure comprises a tree search structure.

3. The sorting apparatus according to claim 2, in which the tree search structure comprises a multi-bit tree search structure.

4. The sorting apparatus according to claim 3, in which the multi-bit tree search structure comprises a plurality of search levels.

5. The sorting apparatus according to claim 4, in which the multi-bit tree search structure comprises a first search level comprising at least one node.

6. The sorting apparatus according to claim 5, in which the multi-bit tree search structure comprises one or more further search levels, each comprising one or more nodes linked to a node of the preceding search level and wherein an independently accessible memory location is associated with each searching level.

7. The sorting apparatus according to claim 5, in which at least some of the nodes contain the record of units in the tag storage structure.

8. The sorting apparatus according to claim 5, in which each of the nodes comprises one or more bits.

9. The sorting apparatus according to claim 8, in which at least some of the bits of the nodes contain the record of units in the tag storage structure.

10. The sorting apparatus according to claim 5, in which the multi-bit tree search structure is adapted to search for the closest matching tag by comparing at least one segment of the tag being sorted with at least one node of one or more search levels to find the closest match to the or each segment, and hence to find the closest matching tag to the tag being sorted.

11. The sorting apparatus according to claim 10, in which the multi-bit tree search structure is adapted to search for the closest matching tag by comparing a first segment of the tag being sorted with a node of a first search level of the multi-bit tree search structure to find the closest match to the first segment and a node in a second search level of the multi-bit tree search structure to which the node in the first search level is linked, comparing a second segment of the tag being sorted with the node of the second search level to find the closest match to the second segment and a node in a third search level of the multi-bit tree search structure to which the node in the second search level is linked, and comparing a third segment of the tag being sorted with the node of the third search level to find the closest match to the third segment, and hence the closest matching tag to the tag being sorted.

12. The sorting apparatus according to claim 2, in which the tree search structure is adapted to update its record of the units in the tag storage structure.

13. The sorting apparatus according to claim 1, in which the tag location pointer structure comprises a location for a location pointer for each tag which may be sorted by the sorting apparatus into the tag storage structure.

14. The sorting apparatus according to claim 13, in which a location contains a location pointer for a tag if that tag has been sorted by the sorting apparatus into the tag storage structure.

15. The sorting apparatus according to claim 13, in which the sorting apparatus places a location pointer for a tag into the tag location pointer structure after the tag has been sorted.

16. The sorting apparatus according to claim 1, in which the tag location pointer structure comprises a look-up table.

17. The sorting apparatus according to claim 1, in which the tag search structure comprises a tree search structure and the tag location pointer structure is linked to the tag search structure.

18. The sorting apparatus according to claim 17, in which the tag location pointer structure is linked to the tag search structure so that it effectively comprises a lowest level of the tree search structure of the tag search structure.

19. The sorting apparatus according to claim 1, in which the sorting apparatus operates a tag sorting policy to sort the units into the pre-determined order.

20. The sorting apparatus according to claim 1, in which the sorting apparatus comprises a distributed memory architecture for the tag search structure and the tag location pointer structure.

21. The sorting apparatus according to claim 20, in which the tag search structure comprises a tree search structure, the tree search structure comprises a plurality of search levels, and each search level of the tree search structure of the tag search structure and the tag location pointer structure comprise independently accessible memory architectures.

22. The sorting apparatus according to claim 1, in which the units stored in the linked list are linked together such that they are in the pre-determined order.

23. A method of sorting units into a tag storage structure in accordance with a pre-determined order, using a sorting apparatus comprising:
 a tag search structure containing a record of units in the tag storage structure; and a tag location pointer structure containing location pointers for units in the tag storage structure, wherein the system comprises a distributed memory for the tag search structure and tag location pointer, the distributed memory having a plurality of independently accessible memory locations forming a parallel pipeline structure for the sorting apparatus, the method comprising:

receiving a tag being sorted at the sorting apparatus;

using the tag search structure to:
  reading the tag being sorted;
    search for a closest matching tag to the tag being sorted using the record of the tag in the tag storage structure;
    access the tag location pointer structure; and
    retrieve a location pointer for the closest matching tag, wherein:

the sorting apparatus uses the location pointer of the closest matching tag to access a linked list in the tag storage structure and to place the tag being sorted into the tag storage structure in an appropriate position in accordance with the pre-determined order.

24. A packet scheduler comprising a sorting apparatus according to claim 1.

* * * * *